United States Patent [19]

Wagner et al.

[11] 3,781,681

[45] Dec. 25, 1973

[54] TEST PROBE APPARATUS

[75] Inventors: John W. Wagner, Hopewell Junction; Paul M. Young, Pleasant Valley, both of N.Y.

[73] Assignee: International Business Machines Corporation, Armonk, N.Y.

[22] Filed: Dec. 17, 1971

[21] Appl. No.: 209,236

[52] U.S. Cl............................. 324/158 P, 324/72.5
[51] Int. Cl.............................................. G01r 31/02
[58] Field of Search.................... 324/158 P, 158 F, 324/158 R, 72.5, 149

[56] References Cited
UNITED STATES PATENTS
3,648,169   3/1972   Wiesler............................ 324/158 F
3,584,300   6/1971   Schulz............................. 324/158 F OTHER PUBLICATIONS
"Future Probers–Here Now," EDN; Nov. 11, 1968.

Wagner et al. "Orbiting Probe," IBM Tech. Dis. Bull., Dec. 1970, pp. 2113–2114.

*Primary Examiner*—Rudolph V. Rolinec
*Assistant Examiner*—Ernest F. Karlsen
*Attorney*—John E. Osterndorf et al.

[57] ABSTRACT

An array of test probes individually mounted to a test fixture is provided for contacting a substantially increased number of pads on high density circuit chips. The probes are mounted in side by side relationship in groups with each group of probes making contact with respective pads that are proximately positioned and, preferably, on the same radial line of a chip. Each probe has a contact blade carried by parallel springs of minimum gram load to assure uniform force deflection contact ratios and each blade-spring arrangement acts as the electrical conducting circuit for that probe of the array.

7 Claims, 8 Drawing Figures

TEST PROBE APPARATUS

BACKGROUND OF THE INVENTION

1. Field of the Invention

This invention relates to apparatus for establishing temporary electrical connection between test stimuli and measurement systems and electrical conducting devices under test. More particularly, the invention is concerned with test probes arranged in an array to provide uniform electrical and mechanical contact to a large number of pads on a semi-conductor integrated circuit chip while the device is under test.

2. Description of the Prior Art

As the complexity of integrated circuit devices has increased, hundreds of individual circuits have been contained within a single semiconductor package such as a chip. With the increased density of circuits on a single device, it has become impossible to test each individual circuit in the particular device. Although the number of input/output pads for accessing the circuits on a chip has increased, this increase has not been directly proportional to the increase in the number of circuits. Consequently, the task of testing this type of circuit package has similarly become more complex.

Functional testing of the device is therefore performed on an entire package to determine the expected performance of the unit under test. To maximize the effectiveness of this functional testing, input/output contact is required to the increased number of pads for applying stimuli and detecting responses. The problem of contact has been compounded by the necessity for arranging the pattern of increased number of pads over a greater portion of the chip surface. One such arrangement contemplates the positioning of the pads on a series of concentric circles. It also requires that contact be made by separate probes to pads that are proximately positioned and on the same radial line.

To accomplish this contact, probe arrays have been proposed wherein the probes are arranged on the same radial line as the pads. However, as these probes are mounted in tiers or a multilevel stacking arrangement, each has an approach angle with respect to its particular pad which differs from all others. Thus, the probe contacting a pad on an inner concentric circle has a greater angle of approach than the probe contacting the pad on an outer concentric circle. The probes do not move about the same center of rotation while applying the contact force to the pads resulting in wasted motion or scrub, unevenness of contact, failure to contact in some instances and damage to the pad metallurgy on the chip occurring due to welding of the probe tip to the pad when the probe is energized. Another type of probe arrangement that has been proposed employs plunger type probes. However, with such arrangements, it is not possible to obtain the control of the pressure necessary for each individual probe.

To compensate for these faults, probe arrays have been suggested having probes arranged in side by side relationship. Such arrangements ordinarily are not able to contact pads located on the same radial line. If they are able to make such contact, it cannot be done with a uniform force deflection ratio. These probes employ an arm for carrying a large gram load includng the contact blade with the arm operating from a fixed pivot. In the alternative, when the arms act with spring motion and are used to apply the contact force, they carry wires directly to the probe tip to establish the electrical connection between the elements of the array and externally coupled test apparatus. The presence of these electrical conducting wires imparts both a side motion as well as a vertical motion to the contact blade carrying arm preventing uniform load carrying forces from being applied to the pads on the chip under test. Moreover, the presence of these wires between adjacent probes requires the use of space otherwise available for additional probes to make contact with the increased number of pads on the high density circuit chips.

SUMMARY OF THE INVENTION

As contrasted with the probe fixtures of the prior art, the probe apparatus of the invention provides for the contacting of a large number of pads on high density circuit chips having upwards of hundreds of circuits. Contact is made to the pads with a uniform force deflection ratio by a substantially increased number of probes.

In accordance with one aspect of the invention, the individual probes are arranged in an array and carried at a common mounting plane by a holder. The arrangement of probes is in a plurality of groups. Each group contacts the respective ones of a group of pads proximately positioned with respect to one another and preferably arranged along a single radial line of the chip. Each probe presents the same contact angle of aproach to its respective pad thus substantially eliminating any scrub motion problem.

Each probe includes a body portion having a locking element which is retained at the mounting plane of an array holder. Parallel springs extend from the probe body and carry the probe tip or blade which contacts the chip pad. From the body, the parallel springs and blades are adjustable as to height as well as tangential and radial movement. In this way, positioning of the probe with respect to the pad to be contacted is established, and the deflection and force applied by the probe to the pad is controlled. The parallel springs and tip blade act as the electrical conducting circuit for the probe and are connected to extensions of the spring for coupling to the external electrical circuitry so as to avoid any interference with the control of deflection and force exercised by the springs. The need for any additional wires which adversely affect the force deflection ratio for the probe and the packing desity of the probe is also avoided. Each of these parallel spring arrangements is the same length as all others and each provides substantially the same gram load to a contacted pad as all others.

When arranged in side by side relationship in an array, the probes of the invention may be employed to make contact with the pads along a single radial line of a chip. The chip may be held as a single device or may be contained in a wafer of a number of such chips and in which the wafer is moved with respect to the probe apparatus by a wafer stepping apparatus.

The probe apparatus makes temporary electrical connection to the pads on the chip and there is no necessity for the pads to be all located on the periphery of the chip. By utilizing the individual adjustments available on each probe and by carrying all probes on a common mounting plane, the same force deflection ratio is applied by all probes irrespective of location on the mounting plane. The arrangement of probes in a test fixture is capable of applying stimuli and detecting responses for both ac and dc tests.

DESCRIPTION OF THE PREFERRED EMBODIMENT

Figure 1:
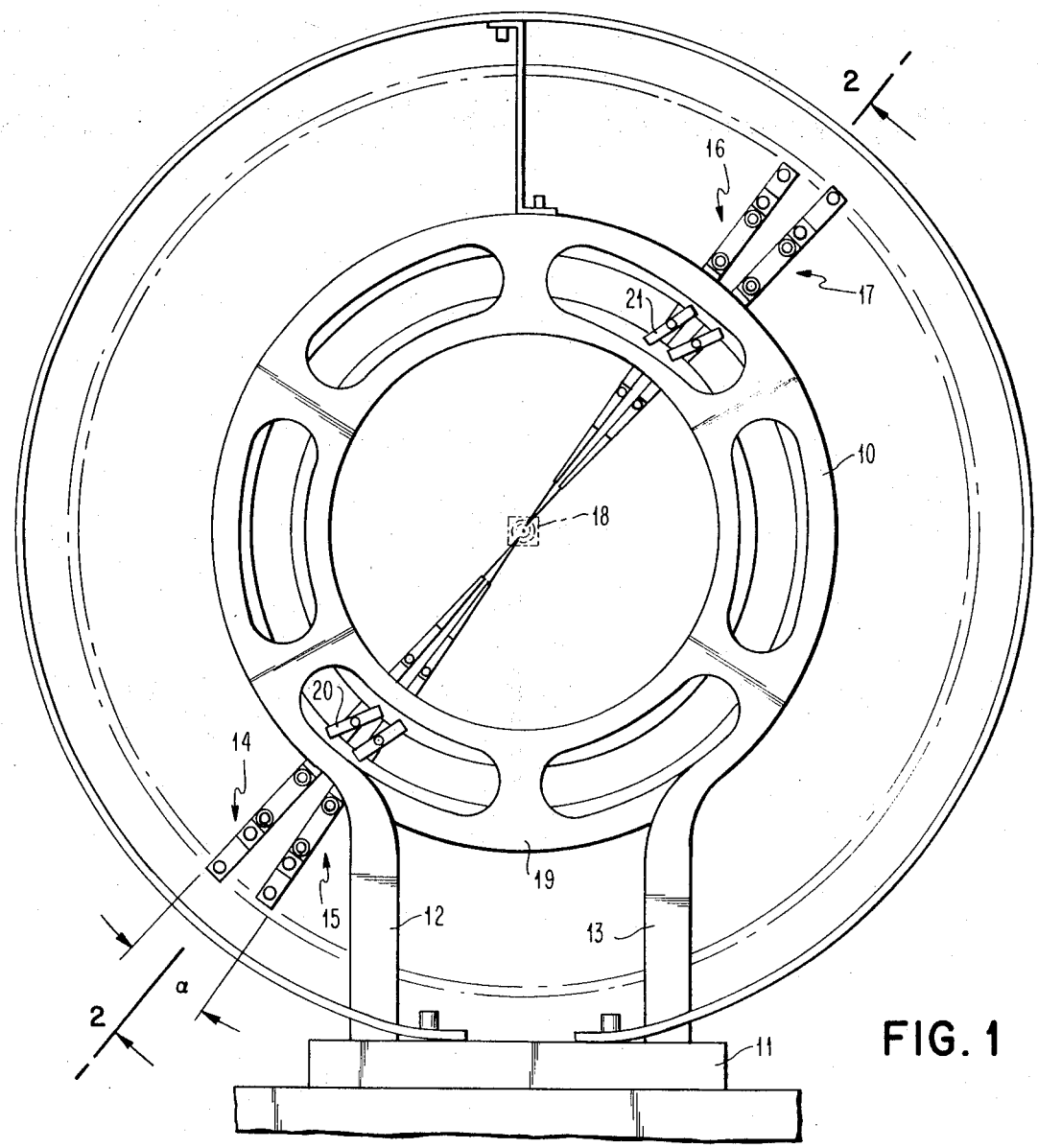
FIG. 1 is a schematic diagram of the test probe apparatus of the invention showing some of the probes in groups arranged on a common mounting apparatus.

Referring now to FIG. 1, the principles of the invention are embodied in the probes and the array of such probes mounted in side by side relationship with one another in groups on a holder for contacting the terminal of an electrical conducting device under test. Holder ring 10 is mounted to a suitable base support 11 by arms 12, 13 extending from ring 10. The probes 14, 15 and 16, 17 are arranged in groups so that their respective contact tips establish temporary electrical connection with the device 18 under test such as a semiconductor integrated circuit chip.

Chip 18 is of high density type having a size approximating 165 mils by 165 mils containing logic performing and information storing circuits numbering in the hundreds. The chip may be a single device retained by a holding apparatus or one of a number of chips contained in wafer form. The wafer may be moved to the test location such as that occupied by chip 18 using conventional wafer stepping apparatus. As will be apparent from the description which follows hereinafter, the pads on chip 18 for input/output access are arranged at locations distributed across the surface of the chip. Preferably, the pads are located on concentric circles about the center of the chip.

Each group of probes such as the group formed of probes 14, 15 is arranged to make contact with pads that are proximately positioned with respect to one another and which preferably are located on the same radial line of the chip. The probes in a group are mounted side by side to a common mounting plane 19 by adjustable locking T-bars 20, 21. Each group of probes such as the probes 14, 15 occupies a sector $\alpha$ which approximates less then 5°.

Figure 2:
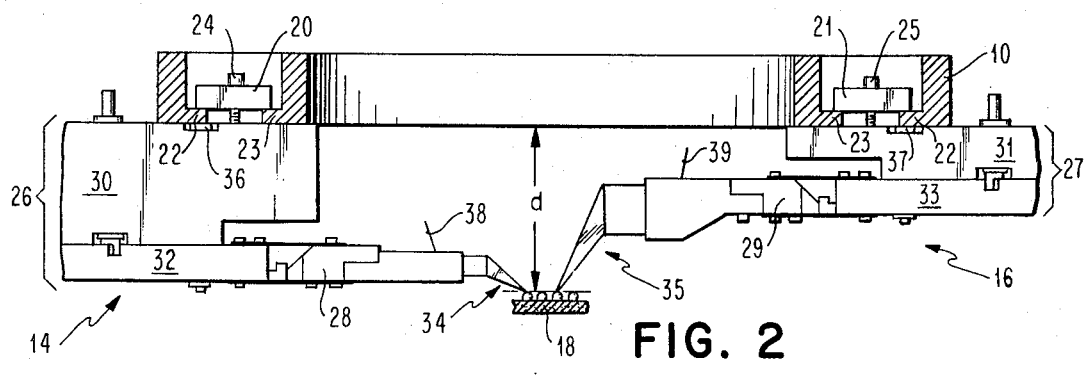
FIG. 2 is a sectional view taken on the line 2—2 of FIG. 1 indicating the contacting by probes pads located on the same diameter of a chip.

As shown in the sectional view of FIG. 2, probes 14 and 16 are mounted by adjustable T-bars 20, 21 on the recessed shoulders 22, 23 of holder ring 10. The T-bar is suitably mounted to probe 14 by screw mounts 24, 25. Each of the probes 14, 16 has a body portion 26, 27, respectively, and a nose piece 28, 29. The nose pieces have tip assemblies 34, 35 mounted to them. The body portions 26, 27 consist of two parts, a fixed part 30, 31 and an adjustable part 32, 33. As will be apparent from the more detailed description of these probes which follows hereinafter, the probes are alike in all respects differing only in the height of the fixed body parts 30, 31 and the size of tip assemblies 34, 35.

Chip 18, as is shown, has four pads or terminals along the diameter line 2—2. The pads or terminals are arranged across one surface of the chip in a pattern of two concentric circles. One probe such as probe 14 makes contact with the pad in the outer concentric ring of pads on chip 18 and the other probe such as probe 16 makes contact with a pad in the inner concentric ring of pads.

To minimize any possiblity of scrub motion and to assure that contact is made by all probes in the array with their respective pads, it is necessary that the angles of approach for all probes be substantially equal. The angle of aproach of a probe tip with respect to a pad on the chip to be contacted is the same for all probe tips irrespective of the location of the pad to be contacted, when the distance $d$ between mounting ring or holder 10 and the end of the tips is the same. Thus, as the height of fixed part 31 of probe 16 is less than fixed part 30 of probe 14, the tip of probe 16 is greater in size than the tip of probe 14. When this equality is maintained, the probes may be arranged in groups on holder 10 uniformly contacting terminals or pads proximately positioned with respect to one another and preferably on the same radial line of the chip.

Although two such probes are shown in each group in FIG. 1, it is apparent that additional probes may be included in the same group. By varying the size of the fixed body part of the probe and the tip, all of the plurality of probes in the group can be made to contact pads located on the same radial line by positioning the probes in side by side relationship to the mounting holder 10. Thus, as an example, the pads on the chip 18 may be arranged in four concentric circles on common radial lines and four probes included within each group. The common mounting is determined by the location of pivots provided on each probe and indicated for the probes 14, 16 at 36, 37, respectively. In the test fixture of FIGS. 1 and 2, connection is made from each probe to test apparatus (not shown) by electrical connectors coupled to the extensions 38, 39 of the tip assemblies.

Figure 3:
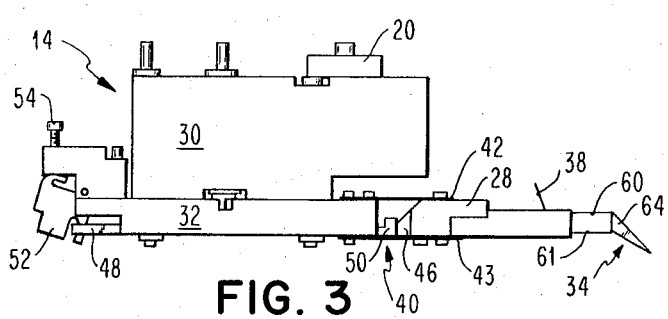
FIGS. 3 and 4 are plan views of the two probes employed in a group for contacting pads that are proximately positioned on a chip.
Figure 4:
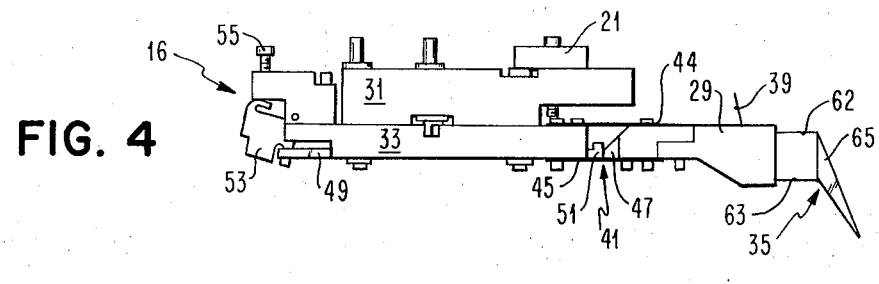

Referring now to FIGS. 3 and 4, the probes 14 and 16 include the fixed body parts 30, 31 and the adjustable body parts 32, 33. Each adjustable body part carries a nose piece 28, 29. Coupling of nose pieces 28, 29 to the adjustable body portions 32, 33 is accomplished by frictionless pivot connections 40, 41. Each such connection is formed of a pair of coplanar parallel beam springs 42, 43 and 44, 45 suitably screw mounted to the adjustable body portions and the nose pieces of each probe.

The spring arrangements acting as the frictionless pivots enable the nose pieces 28, 29 to be adjusted in height by moving the nose pieces to any one of a plurality of planes parallel to one another and to the planes of body portions 26, 27. To accomplish this, nose pieces have at their ends cam surfaces 46, 47 which are acted on by ram type plungers 48, 49 movable within the adjustable body portions 32, 33 and having surfaces 50, 51 for coacting with cam surfaces 46, 47. Movement of plungers 48, 49 is accomplished by pivot blockes 52, 53 acted on by adjustable screws 54, 55. By adjusting a screw 54, 55, the corresponding nose piece of the probe and thus the tip assembly contacting the pad on a chip is adjusted in height or the "z" direction. This aspect of adjustment will be discussed more particularly hereinafter in conjunction with FIG. 6C.

Nose pieces 28, 29 are preferably formed of molded plastic parts and carry tip assemblies including parallel springs 60, 61, 62, 63. Slots may be provided in the molded parts to receive the springs. The pairs of springs are of equal length and determine the force deflection ratio for tip blades 64, 65 which contact the pads of a chip. Although blades 64, 65 are shown as being the contact making elements, it is to be understood that a pin may be affixed to the spring wires reducing the size of the contact elements and, thus, capacitive effects between adjacent contact elements are also reduced.

The tip assemblies 34 and 35 formed of elements 60, 61, 64 and 62, 63, 65, respectively, constitute the electrical conducting circuit for the probes. The springs are anchored in the molded portion of the nose piece and connectors 38, 39 are extensions of the springs 60 and 62, respectively. Electrical connection is to connectors 38, 39 from the external test system apparatus.

Parallel spring pairs 60, 61 and 62, 63 accomplish the control of the force deflection ratio exercised by the blades 64, 65 in contacting the pads of a chip. It is essential that this ratio be controlled in order to minimize the contact resistance of the blade on the chip pad to avoid welding. As an example, where the pad system is formed of lead tin pads, it has been determined that the force necessary for this low contact resistance is in the range of 10,000 to 15,000 pounds per square inch. The load on the tip approximates 7 grams with a 5 mil deflection. By minimizing the gram load of the force controlling element, that is the parallel springs, it is substantially simpler to assure that the desired contact resistance is obtained. To assure that this gram load is minimized and no additional forces are exerted on the tip assemblies, no connection is made to a tip assembly. Thus, electrical connection is made to the extensions 38 and 39 of the springs at a point removed from the anchoring location of the springs.

These connections which may be made to a terminal board forming part of the test system apparatus are accomplished by a wire or copper ribbon to provide a low level conductive path permitting high frequency measurements to be made with the probe. Such a ribbon may be 0.001 of an inch thick by approximately 0.030 of an inch wide. By establishing this connection on the nose piece rather than to the tip assembly as has been performed in prior art types of probes, any effects of the connection on the tip are eliminated preventing any pivotal or rocking motion of the tip assembly. Moreover, by substantially eliminating the mass of the tip assembly the impact on the pad of the device under test is also substantially eliminated and the need for preloading of the tip assembly is likewise eliminated. The need for preloading occurs because of the mass and when the mass is eliminated the need for the preloading is eliminated.

The tip blades 64, 65 may be formed of a noble metal alloy that is heat treatable. One such alloy is the Paliney 7 alloy made by the J. M. Ney Co. This alloy has a high palladium contact and includes silver, gold, platinum, copper and some zinc. The springs 60–63 are formed of beryllium copper of dimensions 0.005 thickness by 0.015 width by 0.27 inches in length. Irrespective of the width of the nose piece holder, this length of the spring wires extending from the nose pieces is constant. The spring wires such as the wires 60, 61 may be formed in a continuous loop and the tip blade 64 suitably soldered to the loop portion or the tip blade may be carried at the ends of the respective springs.

Figure 5:
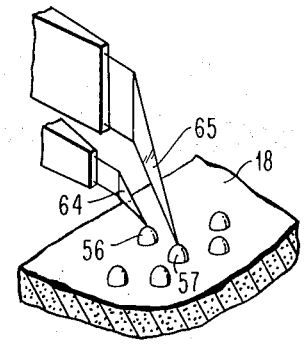
FIG. 5 is a perspective view partially in section indicating how the two probes of FIGS. 3 and 4 make contact with pads located on the same radial line of a chip.

As shown in FIG. 5, the probe tip assemblies for one group of probes are in planes side by side with respect to one another. However, the tip blades 64, 65 contact pads 56, 57 on the same radial line of the chip. The tip blades have the same angle of approach and thus there is no scrub motion of blade 65 of the probe which contacts pad 57 on the inner concentric circle. The tip blades have a contact end which is a radius and which is obtained by tumbling before joining the blades to the parallel springs. The thickness of the tip is varied to meet the size of the pad being contacted. Thus, for a 5 mil diameter pad a 5 mil thickness blade is employed.

Figure 6A:
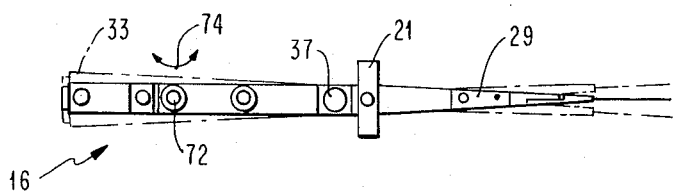
FIGS. 6A, 6B and 6C are plan views of the probe of FIG. 4 illustrating, respectively, the manner in which tangential, radial and height control are exercised on the probe.
Figure 6B:
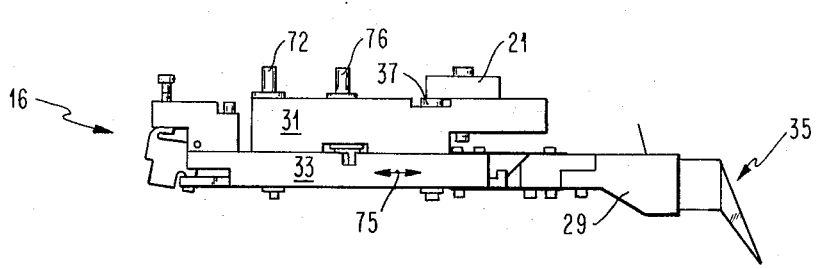
Figure 6C:
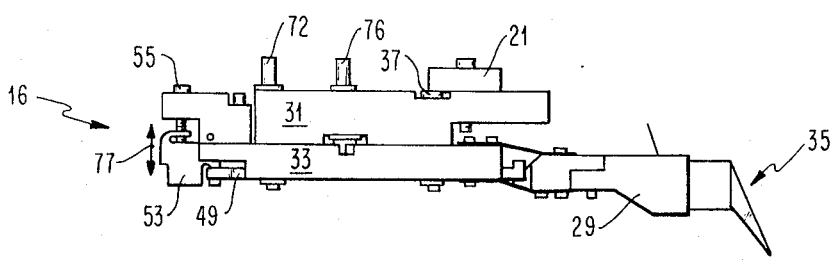

As shown in FIGS. 6A, 6B and 6C, provision is made for accomplishing height adjustment of the nose piece and tip assembly and radial and tangential movement of the adjustable part of the body of probe 16 with respect to the fixed part of the body of the probe. As already stated, the probe is mounted in a common mounting plane as determined by pivot 37, the mounting being accomplished by T-bar mount 21. As shown in FIG. 6A, by adjusting screw adjuster 72, tangential adjustment of the adjustable part 33 of the probe body portion is accomplished. Movement of the adjuster 72 is about arc 74 to effect the movement of portion 33 as shown by the phantom lines. When tangential control is exerted, adjustment of the adjustable portion 33 as well as nose piece 29 is accomplished.

Radial adjustment is accomplished in FIG. 6B at screw adjustor 76 so that the adjustable part of the body 33 and the nose piece move in the plane of arrow 75. It is to be noted that adjustment of the screw adjuster 76 effects adjustment of portion 33 of the body of the probe as well as nose piece 29.

In FIG. 6C, adjustment of nose piece 29 and tip assembly 35 is accomplished independent of the entire body portion of the probe by screw adjuster 55 acting on pivot block 53 and ram 49. Adjustment in the plane of the arrow 77 and nose piece 29 and tip assembly 35 alone are caused to move in the height plane. This movement to any one of a plurality of planes is independent of any force exerted by the body portion of the probe.

In one typical embodiment of the test fixture according to this invention, up to 80 probes are arranged in groups by mounting them to the T-slot ring on holder 10. The arrangement of probes contacts pads on a chip which are arranged in three concentric circles of 30, 30 and 20, respectively. Some of the probe groups contain three probes and others two in such a configuration. Each probe of a group occupies about four and one-half degrees of arc. The probes in each group are arranged in side by side relationship and the probe tips of some of the groups establish contact with a pad on each of the outer two concentric circles only while others of the groups establish contact with pads on all three of the concentric circles.

Although the probes have been described as each including a fixed body portion and an adjustable body portion, it is to be understood that a single body element may be used for each group of contact elements. This single body portion has a single mounting for the holder and carries a plurality of adjustable body portions beneath it. Each adjustable body portion, in turn, has its own nose piece and tip assembly and also its own height, tangential and radial adjustors which are acted on through the single body portion.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A probe for making temporary electrical connection between a test apparatus and a terminal of a device under test, comprising
    a body portion including means for retaining said body portion in a fixed position,
    at least one nose piece mechanically coupled to said body portion,
    frictionless pivot means coupling said nose piece to said body portion and cam means intermediate said body portion and said nose piece, and cam follower means on said nose piece for cooperation with said cam means, plunger means connected to said cam means and extended longitudinally of said body portion, and means connected to said plunger means remote from said frictionless pivot means for displacing said nose piece to effect a positioning of said nose piece in any one of a plurality of planes parallel to one another and independent of the positional plane of said body portion,
    a tip assembly including second frictionless pivot means connected to said nose piece and extending from said nose piece to provide said temporary electrical connection, and
    means coupling said test apparatus to that part of said tip assembly anchored to said nose piece.

2. The probe of claim 1 wherein said second frictionless pivot means of said tip assembly comprises a pair of spatially separated parallel springs anchored at one end each to said nose piece for controlling the force and deflection applied in making said temporary electrical connection and a tip blade secured at the other ends of said springs for making said connection.

3. The probe of claim 1 wherein said body portion is formed of two parts with the first part having said provision for retention and said second part being coupled to said nose piece and movable radially and tangentially of said first part and means operable independently of one another for effecting radial and tangential movement of the second part with respect to the first.

4. A test fixture for establishing a plurality of individual temporary electrical connections between a test apparatus and respective ones of a plurality of terminals of an electrically conducting device under test, comprising
    a holder having a common mounting plane, and
    an array of probes having body portions arranged in side by side relationship and in groups and mounted to said holder at the plane,
    each group of probes being positioned to contact individual ones of a plurality of proximately positioned terminals equivalent in number to the number of probes in the group and in which each of the terminals to be contacted by the respective ones of a group of probes has a different radial distance on said device,
    each of said probes including a nose piece, frictionless pivot means coupling said nose piece to said body portion and a tip assembly including second frictionless pivot means connected to said nose piece, and cam means intermediate said body portion and said nose piece and cam follower means on said nose piece for cooperation with said cam means, plunger means connected to said cam means and extended longitudinally of said body portion, and means connected to said plunger means remote from said frictionless pivot means for displacing said nose piece to effect a positioning of said nose piece for providing the same contact angle of approach of its tip assembly to its respective terminal as all other probes in that group.

5. The fixture of claim 4, wherein said tip assemblies of each of said probes includes a blade for contacting a terminal and all of the blades of a group define points on the same axis, whereby terminals on the same radial line of the device are contacted.

6. The fixture of claim 4, wherein each of said probes in a group comprises means for independently adjusting the position of such probe tangentially and radially with respect to said plane.

7. The fixture of claim 4, wherein each of said probes is carried along with the other probes in a group by a single body unit mounted to said holder.

* * * * *